United States Patent
Consol (10) Patent No.: US 10,022,616 B1
(45) Date of Patent: Jul. 17, 2018

(54) DIGITAL VIDEO RECORDER FOR SKATEBOARD RISER

(71) Applicant: Christian Consol, Julian, CA (US)

(72) Inventor: Christian Consol, Julian, CA (US)

(*) Notice: Subject to any disclaimer, the term of this patent is extended or adjusted under 35 U.S.C. 154(b) by 247 days.

(21) Appl. No.: 15/163,502

(22) Filed: May 24, 2016

(51) Int. Cl.
 *A63C 17/26* (2006.01)
 *H04N 5/77* (2006.01)
 *H04N 5/225* (2006.01)

(52) U.S. Cl.
 CPC .......... *A63C 17/26* (2013.01); *H04N 5/2252* (2013.01); *H04N 5/772* (2013.01)

(58) Field of Classification Search
 CPC .... H04N 5/772; H04N 5/2251; H04N 5/2252; G03B 17/02; A63C 17/26; A63C 17/0006
 USPC .......................... 348/373, 374, 375; 396/429
 See application file for complete search history.

(56) References Cited

U.S. PATENT DOCUMENTS

| | | | | |
|---|---|---|---|---|
| 5,067,058 A * | 11/1991 | Standley | ................ | A63C 17/26 180/181 |
| 9,604,125 B2 * | 3/2017 | Page | ...................... | A63C 17/26 |
| 9,878,230 B1 * | 1/2018 | Seele | ...................... | A63C 17/26 |
| 2003/0185019 A1 * | 10/2003 | Rogers | ............... | A63C 17/0093 362/545 |
| 2003/0201620 A1 * | 10/2003 | Seelye | .................... | A63C 17/01 280/87.042 |
| 2005/0030746 A1 * | 2/2005 | Goode | ................... | A63C 17/26 362/253 |
| 2005/0179811 A1 * | 8/2005 | Palatov | ................ | H04N 5/2251 348/373 |
| 2008/0036165 A1 * | 2/2008 | Reinson | ................. | A63C 17/01 280/87.042 |
| 2009/0236811 A1 * | 9/2009 | Lewis | ................ | A63C 17/0093 280/87.042 |
| 2012/0116714 A1 * | 5/2012 | Rogel | ...................... | H04R 1/02 702/150 |
| 2016/0045785 A1 * | 2/2016 | Tzovanis | ................. | H04B 7/26 700/91 |
| 2016/0175693 A1 * | 6/2016 | Page | ...................... | A63C 17/26 280/87.042 |
| 2017/0144056 A1 * | 5/2017 | Evans | ................... | A63C 17/015 |
| 2017/0238124 A1 * | 8/2017 | Anderson | ............ | H04W 4/008 381/332 |

OTHER PUBLICATIONS

Hackhd, http://www.hackhd.com/ retrieved on Jan. 25, 2016.
Shapeways, http://www.shapeways.com/product/ZB2B5V5AM/gopro-skateboard-riser-mount?li=gmerchant&gclid=CPS-v-DW3skCFQEdaQodgx0AKw, retrieved on Jan. 25, 2016.
GoPro Camera Mount, http://www.popphoto.com/jelly-skateboards-riserblocks-have-integrated-gopro-camera-mount, retrieved on Jan. 25, 2016.
Re-play XD, http://www.replayxd.com/product/pro-skateboard-mount/ retrieved on Jan. 25, 2016.

(Continued)

*Primary Examiner* — John Villecco (57) ABSTRACT

A skateboard riser is described. The skateboard riser housing and a camera assembly disposed in the housing. A skateboard is also described. The skateboard includes a skateboard deck, a truck, and a riser coupled between the skateboard deck and the truck. The riser includes a camera assembly and a digital video recorder.

15 Claims, 6 Drawing Sheets

(56) References Cited

OTHER PUBLICATIONS

Zwish Skateboard Camera http://vAm.amazon.com/Zwish-Skateboard-System-Risers-plastic/dp/B018LDZXBS/ref=redir_mobile_desktop/191-4429181-9417642?ie=UTF8&keywords=zwish%20skateboard%20camera&pi=AC_SX236_SY340_FMwebp_QL65&qid=1458775750&ref_=mp_s_a_1_1&sr=8-1, retrieved on Mar. 24, 2016.
J. Determan et al., "Kinetics of the Skateboarding Kickflip" 5th World Congress of Biomechanics, 2006.
Edward C. Frederick et al. "Biomechanics of Skateboarding: Kinetics of the Ollie" Journal of Applied Biomechanics, 2006; 22:33-40. © 2006 Human Kinetics, Inc.
C8211, 1-Key Video recorder H.264/720p COMedia Ltd. Retrieved on Mar. 2, 2016.
DVR6603G Portable DVR Module COMedia Ltd. Retrieved on Nov. 30, 2015.

\* cited by examiner

DIGITAL VIDEO RECORDER FOR SKATEBOARD RISER

BACKGROUND

Skateboarding is an action sport that involves riding on a skateboard and performing tricks. A skateboard generally includes a skateboard deck, a pair of trucks, several bearings, four wheels, and mounting hardware. Additionally, a skateboard may optionally include a pair of risers. A riser is a pad, often made from a hard plastic material, which is placed between a skateboard deck and a skateboard truck. Traditionally, risers have been used on skateboards that are equipped with larger wheels to prevent the wheels from contacting the skateboard deck in normal operating conditions.

At an increasing rate, both at the amateur and the professional level, skateboarders record video of each other performing tricks on a skateboard. The practice of recording another skateboarder performing a trick or stunt is often referred to as "filming." After filming several tricks, one or more video edits may be produced sequentially depicting different skateboarders and skateboard tricks.

Although filming has thrived, recording skateboarding tricks often requires the skateboarder to enlist the help of a friend to hold the camera and follow the skateboarder as he/she performs their trick. In other action sports, such as surfing or snowboarding, cameras have been mounted onto the sporting equipment. In the case of surfing, it is convenient to mount a camera onto a surfboard's nose because a camera that has been mounted onto the nose of a surfboard does not impede the functionality of the surfboard. However, in skateboarding, the entire top and bottom surface of the skateboard is utilized when performing tricks. Additionally, the skateboard is balanced evenly with a center point between the two trucks. The weight and size of a portable action sports camera, which would require additional mounting hardware attached to the surface of the skateboard, may disrupt the skateboarder's ability to ride and perform tricks properly. A camera and a video recording system integrated into a component of the skateboard would allow the skateboarder to record their tricks without the use of an external camera or cameraperson. Additionally, the skateboarder is able to perform and record a wider range of tricks with an integrated recording system that won't impede the functionality of the skateboard.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DESCRIPTION OF EMBODIMENTS

The embodiments described herein address the above noted deficiencies by integrating a digital video recorder and a camera assembly into the riser of a skateboard. As taught in this disclosure, a skateboard riser may be constructed to house a digital video recorder, a battery, and a camera assembly to allow a skateboarder to record skateboard tricks and stunts without requiring the assistance of a second person to hold a video camera. In one example, a digital video recorder and a camera assembly may be disposed in a riser that has been secured to the front truck of the skateboard. In this example, the digital video recorder may record the actions of a skateboard from the perspective of the front of the skateboard. When a riser is placed between the front truck and the skateboard deck, the front of the skateboard is raised relative to the wheels. Thus, a second skateboard riser may be placed on the rear truck of the skateboard to level the height of the back of the skateboard with the front of the skateboard. In one embodiment, a second riser housing, a digital video recorder, and a second camera assembly may be secured to the rear truck of the skateboard in order to record a skateboards actions from a perspective of the rear of the skateboard.

In one embodiment, the skateboard riser is a housing. The housing may include an inner cavity defined by a plurality of side walls including a front wall. The plurality of side walls may be composed of one or more of High Density Polyethylene (HDPE), polyethylene (PE), acrylonitrile butadiene styrene (ABS), polycarbonate (PC), polyvinyl chloride (PVC), rubber, plastic, fiberglass, metal, wood, or another material that can support the weight of a user operating and performing tricks on a skateboard. The housing may also have a top wall and a bottom wall to enclose the inner cavity. In one example, one or more of the side walls, the top wall, or the bottom wall of the riser provide structural support to the riser so that forces (e.g., normal stress, shear stress, compression, tension, and so forth) exerted on the riser (e.g., when the skateboard is used to perform tricks) do not damage the riser or the components inside the riser. The front wall of the riser may include an outer surface having a channel disposed in the outer surface and extending to the inner cavity. The side walls of the riser may also include an outer surface having one or more channels disposed in the outer surface and extending to the inner cavity. The skateboard riser includes a digital video recorder. In one example, the digital video recorder may be encased in the housing. The skateboard riser includes a camera assembly. In one example, the camera assembly may be encased in the housing. In a further example, a camera assembly may be disposed in the channel of the housing. In one example, a digital video recorder may be disposed in the inner cavity of the housing.

Figure 1A:
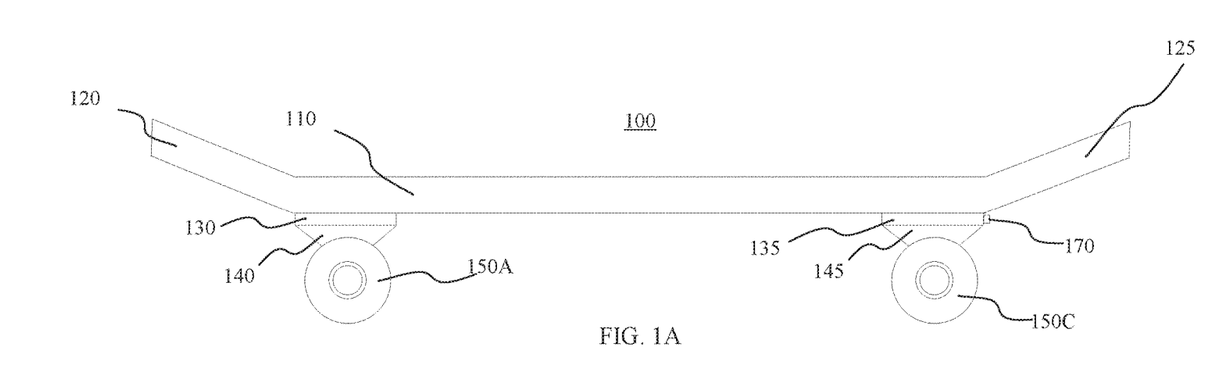
FIG. 1A illustrates a side view of a skateboard including a digital video recorder and a camera assembly encased in a riser, according to one embodiment.
Figure 1B:
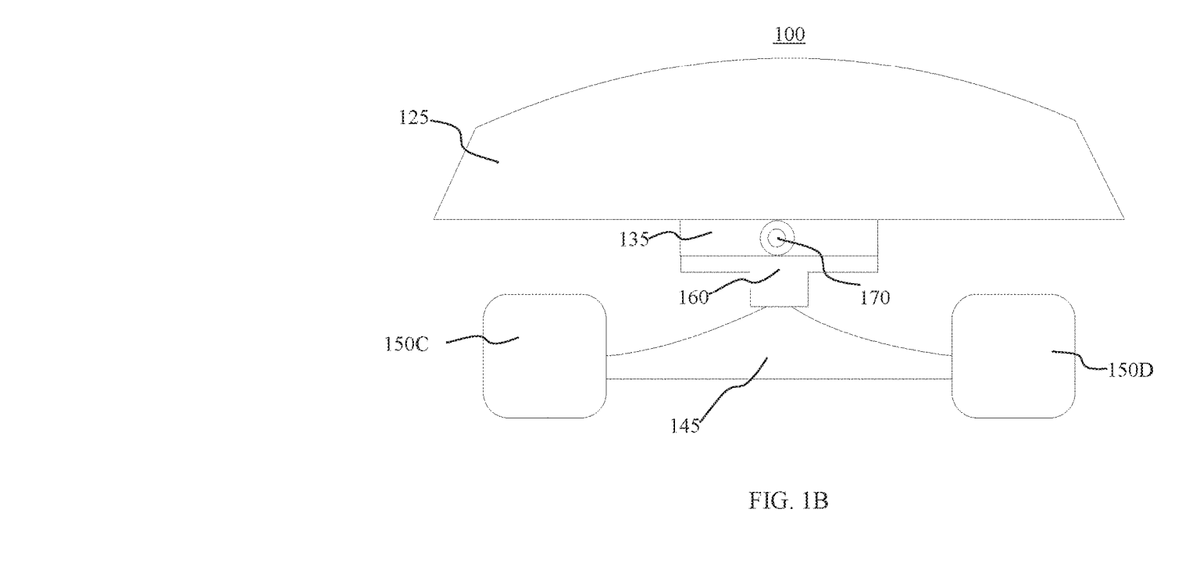
FIG. 1B illustrates a front view of a skateboard including a digital video recorder and camera assembly encased in a riser, according to one embodiment.

FIG. 1A illustrates a side view of a skateboard 100 including a digital video recorder (e.g., digital video recorder 410 in FIG. 4) and a camera assembly 170 encased in a riser 135, according to one embodiment. The skateboard 100 includes a skateboard deck 110. The skateboard deck 110 includes a tail 120 of the skateboard 100 and a nose 125 of the skateboard 100. The skateboard 100 further includes risers 130 and 135, rear truck 140, front truck 145, and wheels 150A-D (wheel 150D is shown in FIG. 1B and 150B is not shown). One or both of the rear truck 140 or front truck 145 may include a riser between the rear truck 140 or front truck 145 and the skateboard deck 110. The skateboard 100 may include a digital video recorder (e.g., digital video recorder 410 in FIG. 4) and a camera assembly 170 encased in the riser 135. In one example, one or more of risers 130 or 135 may have a digital video recorder (e.g., digital video recorder 410 in FIG. 4) and a camera assembly encased in the riser.

In one embodiment, a digital video recorder may be any device that receives image data from a camera assembly and saves video data or image data onto a memory storage device. A camera assembly 170 is the hardware required to capture image data. In one example, the riser 135 is attached to the front truck 145 and includes the digital video recorder and a camera assembly 170 for recording video from the perspective of the front of the skateboard 100. In another example, the riser 130 attached to the rear truck 140 also includes a digital video recorder and camera assembly 170 for recording video from the perspective of the rear of the skateboard 100.

FIG. 1B illustrates a front view of a skateboard 100 including a digital video recorder (e.g., digital video recorder 410 in FIG. 4) and a camera assembly 170 encased in a riser 135, according to one embodiment. In the present embodiment, skateboard 100 includes a riser 135 with a digital video recorder (e.g., digital video recorder 410 in FIG. 4) and camera assembly 170 encased within the riser 135. In this embodiment, the riser 135 connects the front truck 145 with the skateboard 100. In this embodiment, the riser 135 is secured to the baseplate 160 of front truck 145 (e.g., via bolts, via screws, and so forth). In one example, the dimensions of the riser 135 are designed to match the footprint of the baseplate 160. In another example, the riser 135 may be larger or smaller than the footprint of the baseplate 160 of skateboard 100. From the front perspective, only the nose 125 of the skateboard deck 110 is visible. The front truck 145 is attached to two wheels, 150C and 150D. In one example, when a user is riding a skateboard in the forward direction, the digital video recorder can begin recording video, using an interface button, from the perspective of the front of the skateboard. In one example, riser 135 is composed of a HDPE material to support the weight of the rider while protecting and supporting the electronic components encased in the riser 135. In another example, riser 135 may be composed of another plastic, fiberglass, metal, wood, or other material that can support the weight of a rider.

In another embodiment, the rear truck 140 may also include a riser 130 encasing a digital video recorder and camera assembly to record video from the perspective of the rear of the skateboard 100 as a user operates the skateboard 100. In one example, as is often the case, a skateboarder may reverse the direction of the skateboard while moving in a forward direction or performing tricks. In this example, a digital video recorder in both the riser 135 attached to the front truck 145 and the riser 130 attached to the rear truck 140 may be utilized to record video of the trick or stunt as the skateboard moves in the forward direction and performs tricks that switch the orientation of the skateboard 100.

Figure 2:
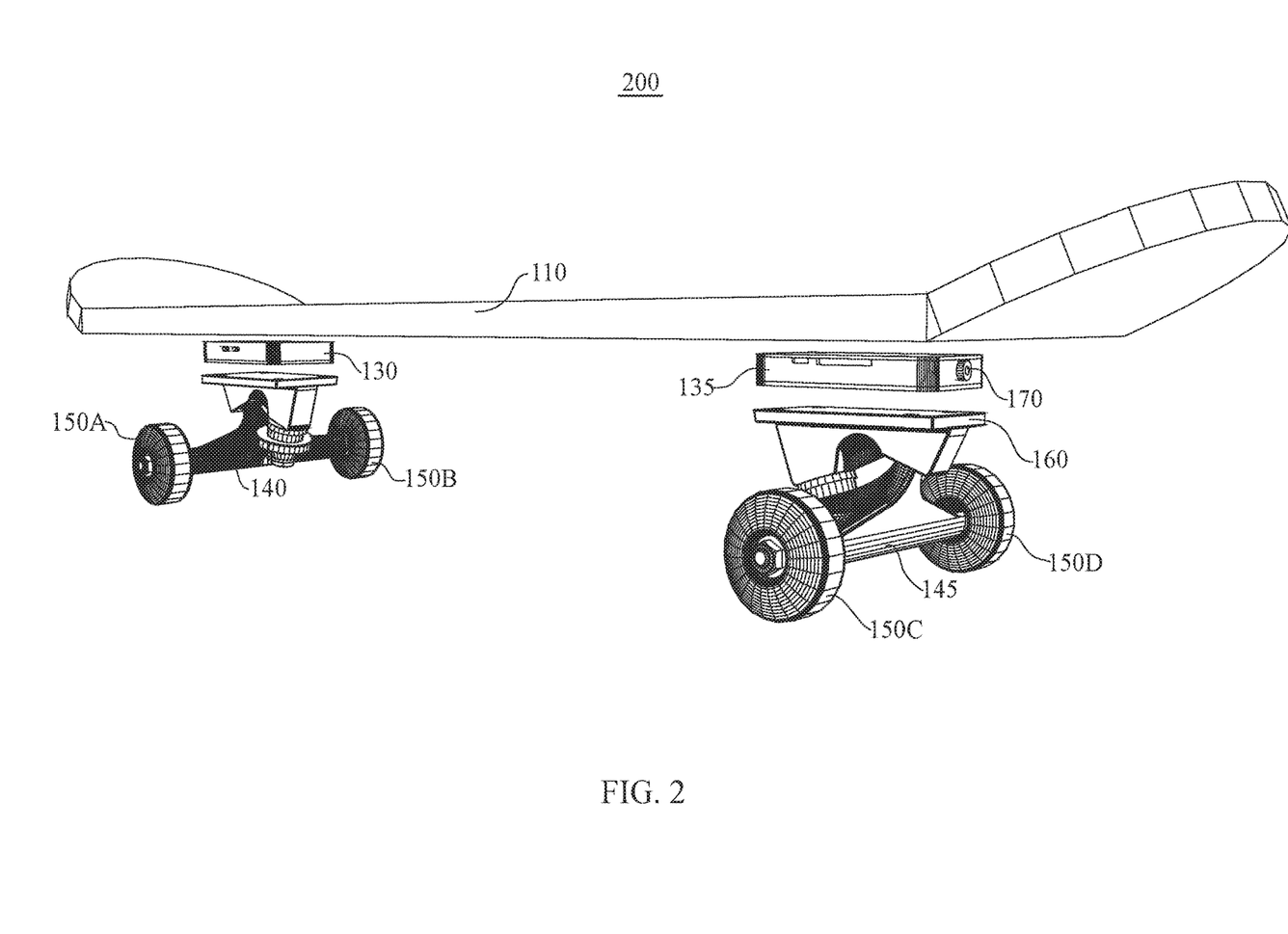
FIG. 2 illustrates an exploded perspective view of a skateboard including a digital video recorder and a camera assembly encased in a riser, according to one embodiment.
Figure 4:
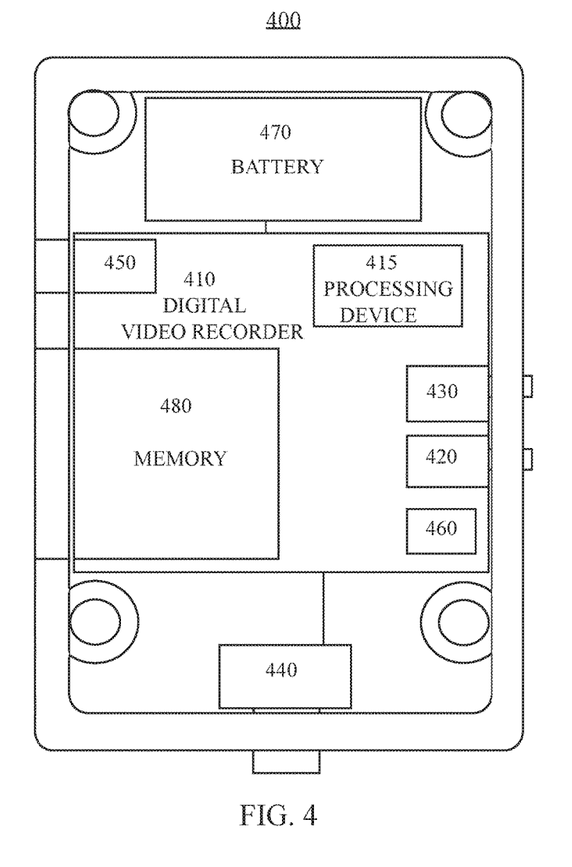
FIG. 4 illustrates an exposed view of a riser, according to one embodiment.

FIG. 2 illustrates an exploded perspective view of a skateboard 200 including a digital video recorder (e.g., digital video recorder 410 in FIG. 4A) and camera assembly 170 encased in a riser 135, according to one embodiment. Riser 130 may also include a digital video recorder and a camera assembly 170. In one embodiment, the camera assembly 170 and digital video recorder may be capable of capturing videos and or recording audio.

Figure 3:
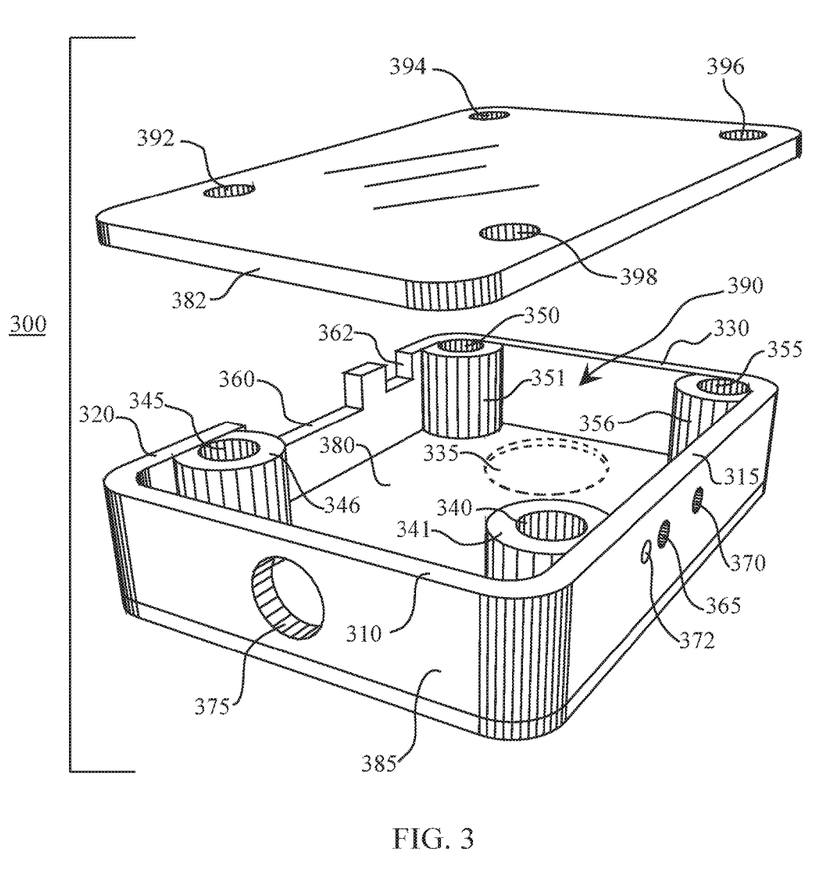
FIG. 3 illustrates an exploded perspective view of a riser, according to one embodiment.

FIG. 3 illustrates an exploded perspective view of a riser 300 of the skateboard 100, according to one embodiment. Riser 300 includes a plurality of weight bearing walls that may be referred to as side walls. The weight bearing walls or side walls include front wall 310 and side walls 315, 320, and 330.

Additionally, the riser 300 includes a bottom wall 380 and a top wall 382. The plurality of weight bearing walls (e.g., 310, 315, 320, and 330), the bottom wall 380, and the top wall 382 form an inner cavity 390. In one example, the inner cavity 390 of the riser 300 houses electronic components such as the digital video recorder (e.g., digital video recorder 410 in FIG. 4), the camera assembly 170, a memory, and a battery. In one example, the riser 300 is constructed out of HDPE. In another example, the riser 300 may be constructed of any plastic, fiberglass, metal, wood, or other material that will support the weight of a user operating a skateboard and performing tricks. The riser 300 may be designed to resist compression, tension, shear stress, and normal stress when a rider is performing dynamic tricks such as an aerial maneuver (e.g., a kick-flip).

For example, landing forces exerted on the riser during a kick-flip maneuver may be from about 2.9 to about 6.4 bodyweights (BWs) (e.g., from about 2.9 to 6.4 times the weight of the user). In another example, forces exerted on the riser from an ollie maneuver off of a 45.7 centimeter platform to ground level may be from about 4.26 to 5.38 BWs. In one embodiment, the weight of a user is from about 222 Newtons (N) (50 pound-force (lbf)) to about 1112 N (250 lbf). In another embodiment, the weight of a user is from about 630 N (142 lbf) to about 796 N (179 lbf). If the weight of the user is 796 N and the force exerted on the skateboard is 1592 N, then the force exerted on the skateboard is 2 BWs.

In one embodiment, the riser 300 is to withstand up to a maximum amount of force with substantially no deformation as a result of the exerted force.

In one embodiment, the maximum amount of force is 7 BWs of a user weighing 1112 N (250 lbf). In another embodiment, the maximum amount of force is 6.5 BWs of a user weighing 890 N (200 lbf). In another embodiment, the maximum amount of force is 6.4 BWs of a user weighing 796 N (179 lbf). In one embodiment, the result of the exerted force is one or more of tensile (pulling) force, compressive (pushing) force, shear force, bending or torsion (twisting) force, and so forth.

In one embodiment the deformation comprises one or more of strain, elastic deformation, plastic deformation, failure, fracture, and so forth. In one embodiment, substantially no deformation is no irreversible deformation (e.g., no plastic deformation, failure, fracture, and so forth). In another embodiment, substantially no deformation is elastic deformation. In another embodiment, substantially no deformation is elastic deformation that deforms (e.g., compresses) the riser no more than 10% any given dimension of the riser (e.g., if the riser is 17 millimeter (mm) tall, 76 mm long and 55 mm wide, the riser would elastically deform to no more than from 15.3 to 18.7 mm tall, from 68.4 mm long to 83.6 mm long, and from 49.5 to 60.5 mm wide).

In one embodiment, the riser 300 or the housing of the riser 300 is to protect the camera assembly and the digital video recorder in response to a force of up to 5094 Newtons (1145 pound-force). In another embodiment, the riser 300 or the housing of the riser 300 is to undergo no irreversible deformation in response to a force of up to 5094 Newtons (1145 pound-force). In another embodiment, the riser 300 or the housing of the riser 300 is to undergo no more than 10% elastic deformation in any dimension in response to a force of up to 5094 Newtons (1145 pound-force).

In one example, the riser 300 may be constructed out of HDPE and include weight bearing walls sufficient to prevent the riser 300 from compressing or having a deformation (e.g., elastic deformation, plastic deformation, and so forth) and damaging the electrical components housed within the riser 300.

In one example, the weight bearing walls 310, 315, 320, and 330, bottom wall 380, and top wall 382 may be between 2 millimeters and 5 millimeters thick to support the weight of the rider. In another example, the weight bearing walls, top, and bottom walls may be less than 2 millimeters thick or greater than 5 millimeters thick depending on the composition of the walls. In one example, the riser 300 may have the dimension 17 millimeters tall, 76 millimeters long and 55 millimeters wide. In other examples, the dimensions of riser 300 may be substantially different to meet the design characteristics of the skateboard and the footprint of the truck base plate (e.g., baseplate 160).

The bottom wall 380 may include a first plurality of channels (e.g., channels 340, 345, 350, and 355) that correspond to a second plurality of channels in the top wall 382 (e.g., channels 392, 394, 396, and 398). A plurality of fasteners (e.g., bolts, screws) may be inserted through a skateboard deck 110, the top wall 382, and the bottom wall 380 to couple the skateboard deck 110, the top wall 382 of riser 300, and the bottom wall 380 of riser 300 with the trucks (e.g., front truck 145, rear truck 140, via the baseplate 160).

The bottom wall 380 may include one or more extrusions (e.g., extrusions 341, 346, 351, and 356) that extend from the top surface of the bottom wall 380 to the bottom surface of the top wall 382. The top surface of the bottom wall 380, bottom surface of the top wall 382, and interior surfaces of the weight bearing walls (e.g., 310, 315, 320, and 330) form the inner cavity 390 of the riser 300. Channel 340 may pass through extrusion 341, channel 345 may pass through extrusion 346, channel 350 may pass through extrusion 351, and channel 355 may pass through extrusion 356. The one or more extrusions may protect components disposed in the riser 300 from the fasteners. The one or more extrusions may give additional support to the riser. In one embodiment, the one or more extrusions may be coupled to the one or more weight bearing walls.

Channels 392, 394, 396, and 398 are disposed on the top surface of the top wall 382 of riser 300 and may extend from the top surface of the top wall 382 to the bottom surface of the top wall 382 of the riser 300. In another embodiment, the channels 340, 345, 350, and 355 or 392, 394, 396, and 398 pass through two or more of the weight bearing walls 310, 315, 320, and 330.

In one embodiment, to secure the riser 300 between a skateboard deck and the front truck or rear truck of the skateboard, a plurality of bolts are inserted through pre-drilled holes in the skateboard deck 110, through channels in the riser 300 (e.g., channels 340, 345, 350, and 355 and 392, 394, 396, and 398), and through holes in the baseplate 160 of the truck. Channels (e.g., channels 340, 345, 350, and 355 and 392, 394, 396, and 398) are designed to align with the pre-drilled holes of the skateboard deck 110 and the holes in the baseplate 160 of the skateboard truck. Bolts are inserted through the top of the skateboard deck 110, channels of the riser 300, and baseplate 160 of the skateboard truck. Nuts are placed at the end of the bolts, securing the components together. In an alternate embodiment, the riser 300 may be designed with additional channels and or extrusions that are compatible with different sized baseplates. In one example, some skateboard decks 110 are designed with more than four predefined holes, which are designed to align with a variety of brands of trucks having different sized baseplates. In this example, the riser 300 may have six or more channels and or extrusions including channels 340, 345, 350, and 355 and 392, 394, 396, and 398 that are compatible with different sized baseplates. Additionally, the shape of channels 340, 345, 350, and 355 and 392, 394, 396, and 398 and extrusions 341, 346, 351, and 356 is not intended to be limiting. The channels 340, 345, 350, and 355 and 392, 394, 396, and 398 and extrusions 341, 346, 351, and 356 may be a variety of different shapes, such as oval, circular, rectangular, and so forth. Furthermore, the riser 300 is described as being located between a skateboard deck and the truck of a skateboard. This description of the riser's location on a skateboard is not meant to be limiting. The riser 300 described herein may be applicable to other board sports (e.g., snowboard, wake board, and so forth), other sports equipment (e.g., roller skate, rollerblade, ice skate, wheeled vehicle, ski, and so forth), or may be utilized with a skateboard deck (e.g., with use of a skateboard truck, without the use of a skateboard truck, and so forth).

In one embodiment, the inner cavity 390 of the riser 300 houses electronic components of the riser including a digital video recorder, a battery, and a camera assembly. The digital video recorder includes a memory, and a data cable port or receptacle. In one example, the digital video recorder records video data or image data onto a memory card. In this example, the digital video recorder receives image data from the camera assembly 170 to record and store on the memory card. The memory card may be inserted into the digital video recorder through a memory card channel 360.

In one embodiment, the riser 300 includes a memory card channel 360 extending from the outer surface of a weight bearing wall (e.g., front wall 310, side wall 315, side wall 320, or side wall 330) to the inner cavity 390 for an insertion of a memory card into a digital video recorder. In this embodiment, the riser 300 includes a digital video recorder coupled with a memory card reader housed in the inner cavity 390 of the riser 300. In one example, the memory card is a memory card having a secure digital formatting. In another embodiment, the memory card channel 360 may be removed, and an internal storage, such as a flash memory or other type of data storage may be used.

In one embodiment, the riser 300 includes a channel 362 extending from the outer surface of a weight bearing wall (e.g., front wall 310, side wall 315, side wall 320, or side wall 330) to the inner cavity 390 for access to a data cable port or receptacle. In this embodiment, the riser 300 includes a digital video recorder, a memory, a battery, and a camera assembly housed in the inner cavity 390 of the riser 300. In one example, the data cable port is a Universal Serial Bus (USB) interface, and is communicatively coupled to the digital video recorder and memory.

In one embodiment, the front wall 310 of the riser 300 includes a channel 375 extending from the outer surface 385 of the front wall 310 to the inner cavity 390. In this embodiment, the camera assembly may be disposed in the channel 375. In one example, the camera assembly may be substantially disposed in the channel 375, however a portion of the camera assembly 170, such as a camera lens, may extend out of the channel 375 for performing a recording. FIGS. 1B, 3, 4, and 5 depict the camera assembly 170 as being disposed in the channel 375 in the center of the front wall 310. In alternate embodiments, the camera lens may be located anywhere on the front wall 310 or on any other weight bearing wall (e.g., walls 315, 320, and 330). In one embodiment, a portion of the camera assembly 170 (e.g., the camera lens) protrudes from the camera assembly 170. In another embodiment, the camera lens may protrude from the front wall 310. In another embodiment, the camera lens may be flush with the outer surface of the front wall 310.

In one embodiment, the riser 300 may include an interface button channel 365 extending from the outer surface of a weight bearing wall (e.g., front wall 310, side wall 315, side wall 320, or side wall 330) to the inner cavity 390 for housing an interface button. In one embodiment, the interface button may be communicatively coupled with the digital video recorder (e.g., digital video recorder 410 in FIG. 4) to control one or more functions of the digital video recorder. The interface button may be substantially disposed in the channel 365. In one embodiment, a portion of the interface button may extend beyond the outer surface of the weight bearing wall (e.g., front wall 310, side wall 315, side wall 320, or side wall 330). In another embodiment, to allow the button to be hermetically sealed, a thin piece of material (e.g., a thin plastic) may be placed over the interface button to prevent liquid, dirt, dust, and debris from entering the inner cavity 390 while still allowing the interface button to be actuated.

In one embodiment, the riser 300 may include a second interface button channel 370 extending from the outer surface of a weight bearing wall (e.g., front wall 310, side wall 315, side wall 320, or side wall 330) to the inner cavity 390 for housing a second interface button communicatively coupled to a digital video recorder (e.g., digital video recorder 410 in FIG. 4).

In one embodiment, the riser 300 may include a third channel 372 extending from the outer surface of a weight bearing wall (e.g. front wall 310, side wall 315, side wall 320, side wall 330) to the inner cavity 390 of riser 300. In one embodiment, channel 372 may provide visual access to an indicator light bulb connected to a digital video recorder (e.g., digital video recorder 410 in FIG. 4) housed in the riser 300. The indicator bulb may be illuminated or flash at different frequencies to indicate which operation the digital video recorder is performing. Channel 372 in the weight bearing wall (e.g. front wall 310, side wall 315, side wall 320, side wall 330) may be filled with a clear plastic, rubber, silicone or other material suitable to allow light from the indicator bulb, contained within the riser 300, to penetrate the weight bearing wall. In an alternate embodiment, channel 372 may be utilized to access an audio/visual output interface, data cable port, or alternate user interface.

In one embodiment, the riser 300 may have one or more weight reduction cavities, such as weight reduction cavity 335. Weight reduction cavity 335 may be located on the bottom wall 380, top wall 382, front wall 310, or side walls 315, 320, or 330. In one example, weight reduction cavity 335 may reduce the weight of the riser 300. In another example, weight reduction cavity 335 may ventilate the inner cavity and allow the digital video recorder, battery, and camera assembly to be cooled by ambient air. In another embodiment, the riser 300 may be hermetically sealed using glue or other sealant to prevent dust, dirt, other debris, and liquid from entering the inner cavity.

FIG. 4 illustrates an exposed top view of a riser 400 of the skateboard 100, according to one embodiment.

The riser 400 includes a digital video recorder 410, a processing device 415, a memory 480, a data cable port 450, a first interface button 420, an indicator light 460, a second interface button 430, a battery 470, and a camera assembly 440, according to one embodiment.

The digital video recorder 410 includes a first interface button 420 to control operations of the digital video recorder 410. In one embodiment, the digital video recorder 410 may have a second interface button to control secondary functions of the digital video recorder 410. In another embodiment, the digital video recorder may include a third or more additional interface buttons to perform other operations.

In another embodiment, the first interface button 420 may be used for multiple operations. In one embodiment, the digital video recorder 410 has a single key operation where the first interface button 420 powers on and powers off the digital video recorder 410 and starts and stops video recording. For example, pushing the first interface button 420 may cause the digital video recorder 410 to turn on, start recording image and or audio data to memory 480, and cause the indicator light 460 to flash. Pressing the first interface button 420 again may cause the digital video recorder 410 to stop recording. Pressing and holding the first interface button 420 until the indicator light 460 stops flashing may power off the digital video recorder 410.

The one or more interface buttons (e.g., first interface button 420, second interface button 430, and so forth) are depicted as buttons for exemplary purposes only. The digital video recorder 410 may be controlled by a knob, a switch, a two-way switch, a dial, a touchscreen, a speaker, or other form of user interface. One or more interface buttons may be different forms of user interface. In one example, the first interface button 420 may be used to control the power on and power off function of the digital video recorder 410, while a secondary electronic device, such as a smart phone may be used to control the digital video recorder and its functions. In this example, the riser may have a component that uses a WI-FI®, BLUETOOTH®, or other wireless communication technology that may be utilized to control the camera assembly and or digital video recorder.

In one embodiment, the riser 400 includes a battery 470. The battery 470 may be a rechargeable battery. In another embodiment, the battery 470 may be a replaceable battery. In one example, the battery 470 may be a rechargeable lithium ion battery. In one embodiment the battery 470 sends electric current to the digital video recorder 410 which relays power to the camera assembly 440. The battery 470 may be connected to the digital video recorder 410 via copper wire or any other wire suited for the transfer of electrical current. The digital video recorder 410 may be connected to the camera assembly 440 via copper wire or any other wire suited for the transfer of electric current and or image data. In another embodiment the battery 470 may be wired directly to both the digital video recorder 410 and the camera assembly 440. In one embodiment the battery 470 may be charged with the data cable port 450 when connected via cable to an external power supply. The port 450 may relay incoming electricity through a charging circuit on the digital video recorder 410 to the battery 470. When the battery 470 of the digital video recorder 410 is charging, an indicator light (e.g., indicator light 460) may pulse or stay illuminated to indicate the battery 470 is charging or is fully charged.

In one embodiment, an indicator light 460 may be a small light bulb (such as an LED) controlled by the digital video recorder 410 to indicate which operation is being performed. The indicator light 460 may provide indications through different flashing patterns (e.g., flashing in 1 Hz ¼ duty cycle, flashing in 1 Hz ½ duty cycle, flashing in ½ Hz, flashing in 3 Hz, flash once and so forth). The different indications may include an indication that the digital video recorder 410 is powered on, that the digital video recorder 410 is ready to record, is recording video, that battery 470 is low, that memory 480 is full, that a memory card is not inserted in the digital video recorder 410, that the digital video recorder 410 is connected to a computing device through the data cable port 450, and so forth. In one example, the indicator light 460 will stay illuminated to indicate the digital video recorder 410 is receiving power. In another example the indicator light may pulse to indicate the digital video recorder 410 is recording image data received from the camera assembly 440. In another embodiment, the indicator light 460 is a screen, a speaker, or other form of user interface. Figures indicating the size and positioning of the indicator light 460 are for example purposes. The indicator light 460 may be placed anywhere inside the inner cavity 390 or embedded into any weight bearing wall (e.g. front wall 310, side wall 315, side wall 320, side wall 330) of the riser.

Memory 480 may be any type of data storage device. In one embodiment, the memory 480 is removable memory having a secure digital (SD) format. In one example, the digital video recorder 410 couples to a SD memory card via SD memory card reader attached to the digital video recorder and stores video and or audio files on the SD memory card. A user may access files on the SD memory card with a personal computer, via data cable port 450, or by removing the SD memory card. In another embodiment, the memory 480 is a data storage device such as a flash memory.

In one embodiment, the data cable port 450 is a cable connection interface capable of transferring data and or electric power between devices (e.g., receiving communications, being charged by an external electrical power supply, and so forth). In one example the data cable port 450 is a "mini B" style USB (Universal Serial Bus) port. In another example, the data cable port 450 is a High-Definition Multimedia Interface (HDMI), or any other cable port capable of transferring data files and/or receiving an electrical signal.

The digital video recorder 410 may include a processing device 415. The processing device 415 is communicatively coupled to the digital video recorder 410. The processing device 415 may execute the various functions of the digital video recorder and or camera assembly via pre-programming or user interface (e.g., interface button 420). The processing device may be configured to receive information (e.g., images, video, audio, and so forth) from one or more of the camera assembly 170, a microphone, and so forth. The processing device 415 can store at least one of captured image data, video data, or audio data on a removable memory card, or other data storage device. In one example, the processing device 415 is a digital signal processor.

In one embodiment, the camera assembly 170 may include a camera lens, a camera aperture, an automatic camera focus, a camera shutter and an image sensor. In one embodiment, the camera lens may have an f/2.0 aperture, 0.5 mm focal length, and be made of glass. The camera lens may have a 55° viewing angle and a focal length covering a large range, such as from arm's length (e.g., 500 mm) to infinity. The camera lens may be any type of optical lens, such as a wide-angle lens, an adjustable lens, or macro lens. The camera lens focus' incoming light onto an image sensor to produce image data. In one embodiment, the image sensor is an active pixel sensor. The active pixel sensor is an image sensor configured to capture light incident from a lens. The active pixel sensor sends image data to the processing device 415. The processing device 415 saves image data to the memory 480. In one example, the active pixel sensor may be a CMOS (Complementary metal-oxide semiconductor). In another example, the active pixel sensor may be a CCD (Charge coupled device), or any other type of sensor capable of converting light into electrons. In one embodiment, the image sensor may produce image data at a resolution such as at 1920×1080. The processing device 415 may be configured to control operation of the camera focus, camera aperture, camera shutter, and image sensor. Skilled persons will appreciate that a variety of types and sizes of suitable lenses and image sensors are commercially available and the description is not meant to be limiting.

In one embodiment, the riser 400 may additionally include a microphone. A microphone may be any device that can convert sound waves into electrical energy, which may be recorded. In one example, the microphone is attached to the digital video recorder 410 and is encased in the housing of the riser 135. The processing device 415 may be configured to control operations of the microphone and receive and store audio data on a memory card, or other data storage device. In another embodiment, the microphone may be located somewhere other than in the housing of the riser 135.

Figure 5A:
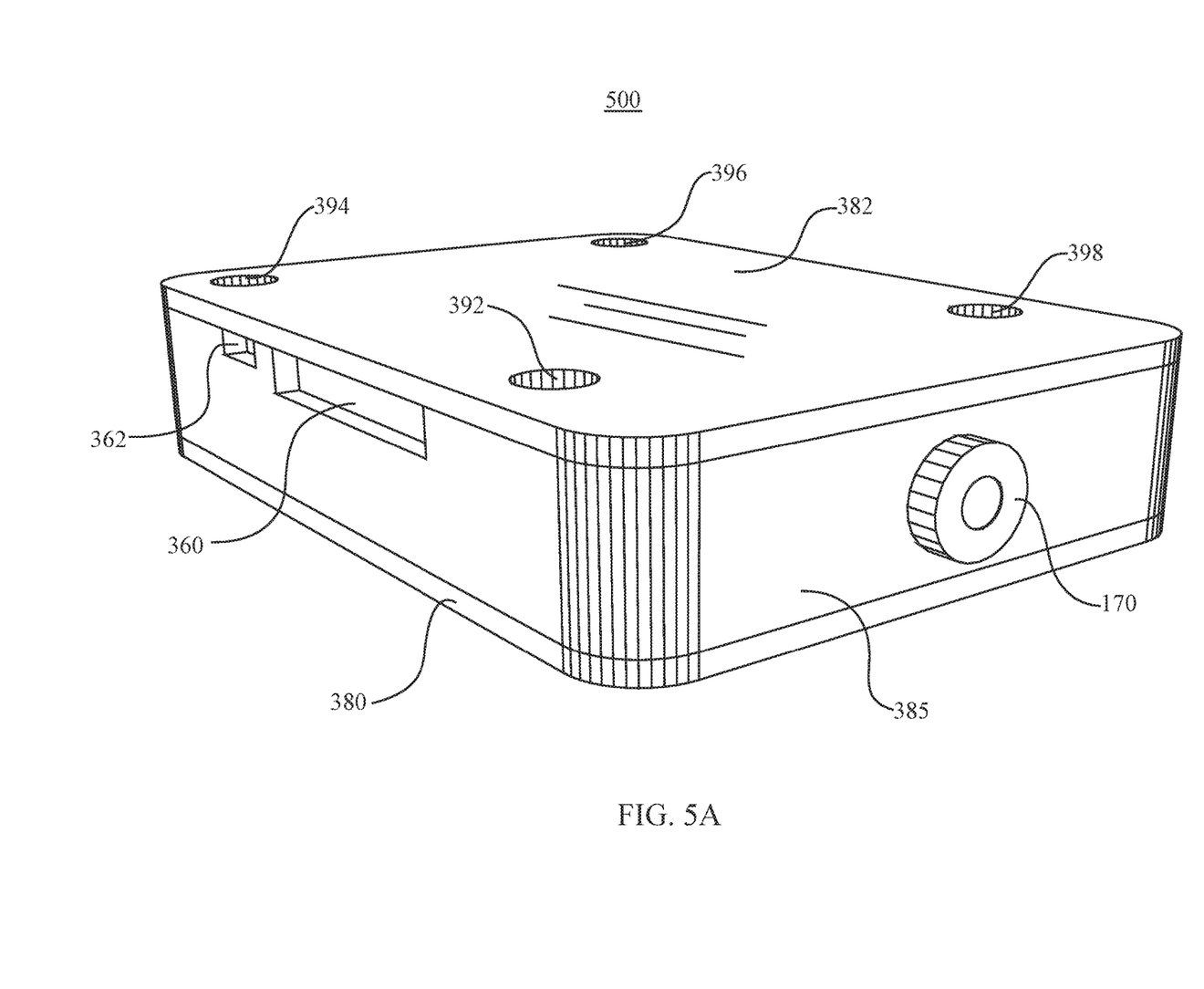
FIG. 5A illustrates an enclosed perspective view of a riser, according to one embodiment.
Figure 5B:
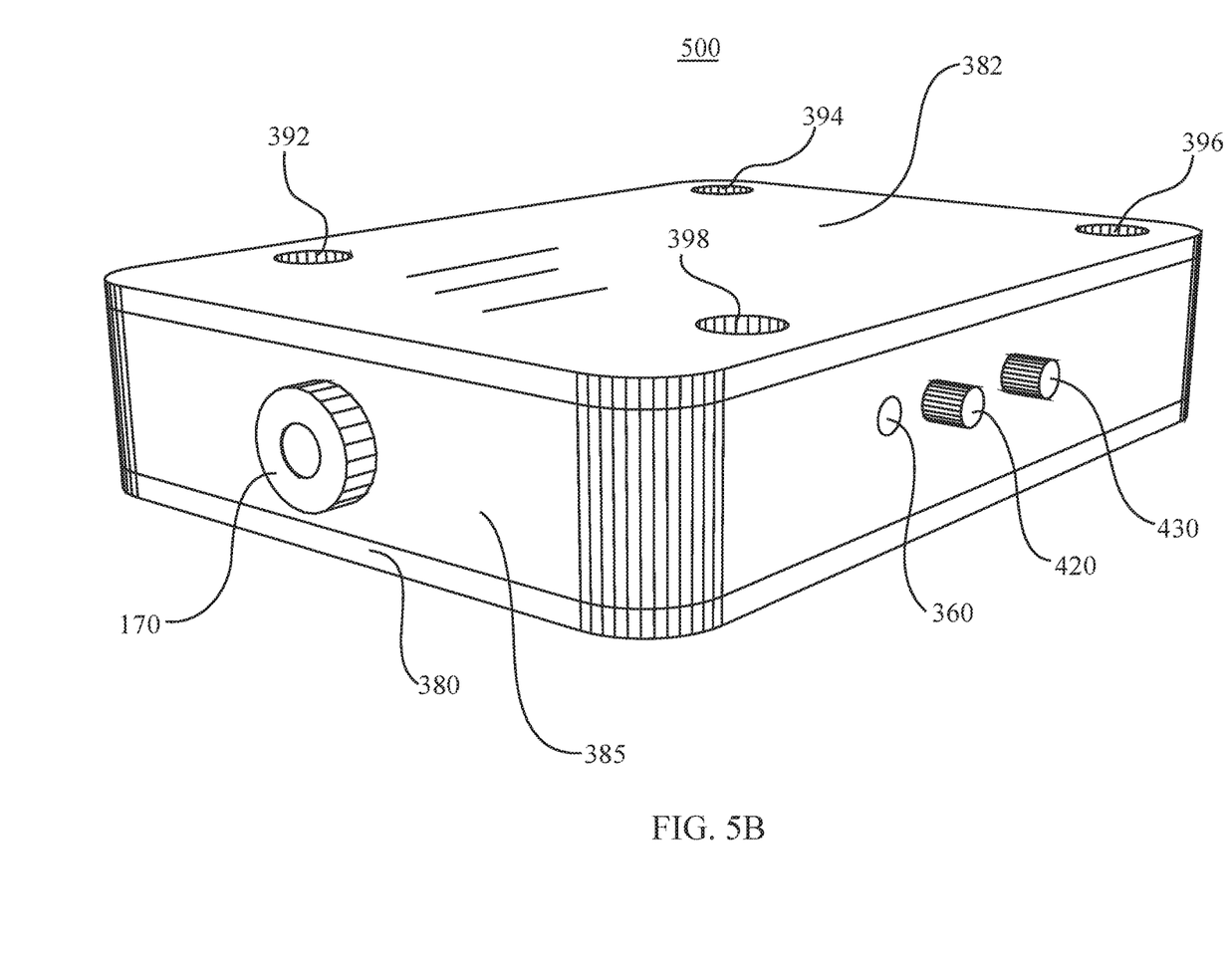
FIG. 5B illustrates an enclosed perspective view of a riser, according to another embodiment.

FIGS. 5A and 5B illustrate enclosed perspective views of a riser 500 of the skateboard 100, according to embodiments of the present disclosure. Riser 500 may be enclosed to prevent dirt or debris from entering into the inner cavity of riser 500. In one example, riser 500 is enclosed by securing a top wall 382 to weight bearing walls 310, 315, 320, and 330. The top wall 382 may secured by glue, resin, or other adhesive. In another embodiment, the top wall 382 may be attached to weight bearing walls 310, 315, 320, and 330 using glue that hermetically seals the riser 500. In one embodiment, riser 500 includes a plurality of channels, including channels 392, 394, 396, and 398 that correspond with the skateboard deck 110, channels of the bottom wall 380 (e.g., channels 340, 345, 350, and 355), and the baseplate 160 of the truck. In one example, channels 392, 394, 396, and 398 are referred to as securing channels. Channels may be used in conjunction with screws or bolts to secure the riser 500 between the skateboard deck and the front truck or rear truck of the skateboard.

In one embodiment, additionally, top wall 382 and bottom wall 380 provide additional structural support for the riser 500. Riser 500 absorbs the impact of rider when a skateboard is used to perform and land an aerial trick. In this embodiment, the riser 500 may need to absorb the shock of impact and vibration without compressing, deforming, or affecting the electrical components of the riser 500. In one example, top wall 382 and bottom wall 380 may have a cushion material attached to their outer surfaces to reduce the dynamic forces and weight applied by a rider. The cushion material may be made from neoprene (e.g., polychloroprene, chloroprene, and so forth), expanded polytetrafluoroethylene (PTFE), foam rubber (e.g., cellular rubber, sponge rubber, expanded rubber, polyurethane, latex, and so forth), or other material to reduce stress between two mating surfaces.

The invention claimed is:

1. An apparatus, comprising:
   a skateboard riser disposed between a skateboard deck and a skateboard truck comprising:
   a housing disposed between the skateboard deck and the skateboard truck; wherein the housing comprises:
   a top wall;
   a bottom wall;

wherein a first plurality of securing channels in the bottom wall correspond to a second plurality of securing channels in the top wall to receive a plurality of fasteners through the skateboard deck, the top wall, and the bottom wall; and a camera assembly including an image sensor disposed entirely within the housing.

2. The apparatus of claim 1, further comprising a digital video recorder, wherein the camera assembly is communicatively coupled to the digital video recorder.

3. The apparatus of claim 2, wherein the digital video recorder comprises a processing device and is compatible with a secure digital memory card.

4. The apparatus of claim 2, further comprising a memory coupled to the digital video recorder.

5. The apparatus of claim 4, wherein the memory is a memory card.

6. The apparatus of claim 1, wherein the housing further comprises:

a plurality of side walls including a front wall, wherein the plurality of side walls, the top wall, and the bottom wall form an inner cavity and a channel extends from an outer surface of the front wall to the inner cavity.

7. The apparatus of claim 6, wherein the housing is to protect components in the housing and support weight of a user operating the skateboard without compressing, wherein the components comprise the camera assembly and a digital video recorder.

8. The apparatus of claim 6, wherein the camera assembly is at least partially disposed in the channel of the housing.

9. The apparatus of claim 6, wherein a digital video recorder is disposed in the inner cavity of the housing and the digital video recorder is communicatively coupled to the camera assembly.

10. The apparatus of claim 2, further comprising one or more interface buttons operatively coupled to the digital video recorder to control operations of the digital video recorder.

11. The apparatus of claim 6, further comprising a battery, wherein the battery is disposed in the inner cavity and is operatively coupled to a digital video recorder and the camera assembly.

12. The apparatus of claim 11, wherein the battery is rechargeable.

13. The apparatus of claim 1, wherein the housing comprises high density polyethylene.

14. The apparatus of claim 1, wherein the housing is to undergo no irreversible deformation in response to a force of up to 5094 Newtons (1145 pound-force).

15. The apparatus of claim 1, wherein the housing is to undergo no more than 10% elastic deformation in any dimension in response to a force of up to 5094 Newtons (1145 pound-force).

* * * * *